United States Patent [19]

Burst et al.

[11] 4,363,510
[45] Dec. 14, 1982

[54] COVER FOR PASSENGER CAR TRUNKS

[75] Inventors: Hermann Burst, Rutesheim; Leo Macho, Hemmingen, both of Fed. Rep. of Germany

[73] Assignee: Dr. Ing. h.c.F. Porsche A.G., Stuttgart, Fed. Rep. of Germany

[21] Appl. No.: 195,856

[22] Filed: Oct. 10, 1980

[30] Foreign Application Priority Data

Oct. 10, 1979 [DE] Fed. Rep. of Germany ....... 2941018

[51] Int. Cl.$^3$ ............................................... B60R 5/04
[52] U.S. Cl. .................................................. 296/37.16
[58] Field of Search ........................... 296/37.16, 37.1; 160/328, 327

[56] References Cited

U.S. PATENT DOCUMENTS 3,237,778 3/1966 Hoodis ................................. 160/327
4,148,516 4/1979 Gotomyo ............................ 296/37.1
4,222,601 9/1980 White et al. ...................... 296/37.16

Primary Examiner—Robert R. Song
Attorney, Agent, or Firm—Paul M. Craig, Jr.

[57] ABSTRACT

A cover for passenger car trunks that are accessible through a rear wheel or tailgate that is movable about a horizontal hinge axis, said cover being made with elastic material and attached to a trunk body portion and the rear lid. The attachment of the cover to the trunk body portion and lid is achieved by elastic members that are spaced from each other on the cover and are located in hollow elements that are connected to the cover and extend perpendicularly to a vehicle longitudinal axis. In accordance with a preferred embodiment, the hollow body members are tubes about which the cover is wrapped and through which elastic cords pass or within which they are fixed, the elastic cords being connected by releasable snap lock fasteners to the body and lid, respectively.

9 Claims, 4 Drawing Figures

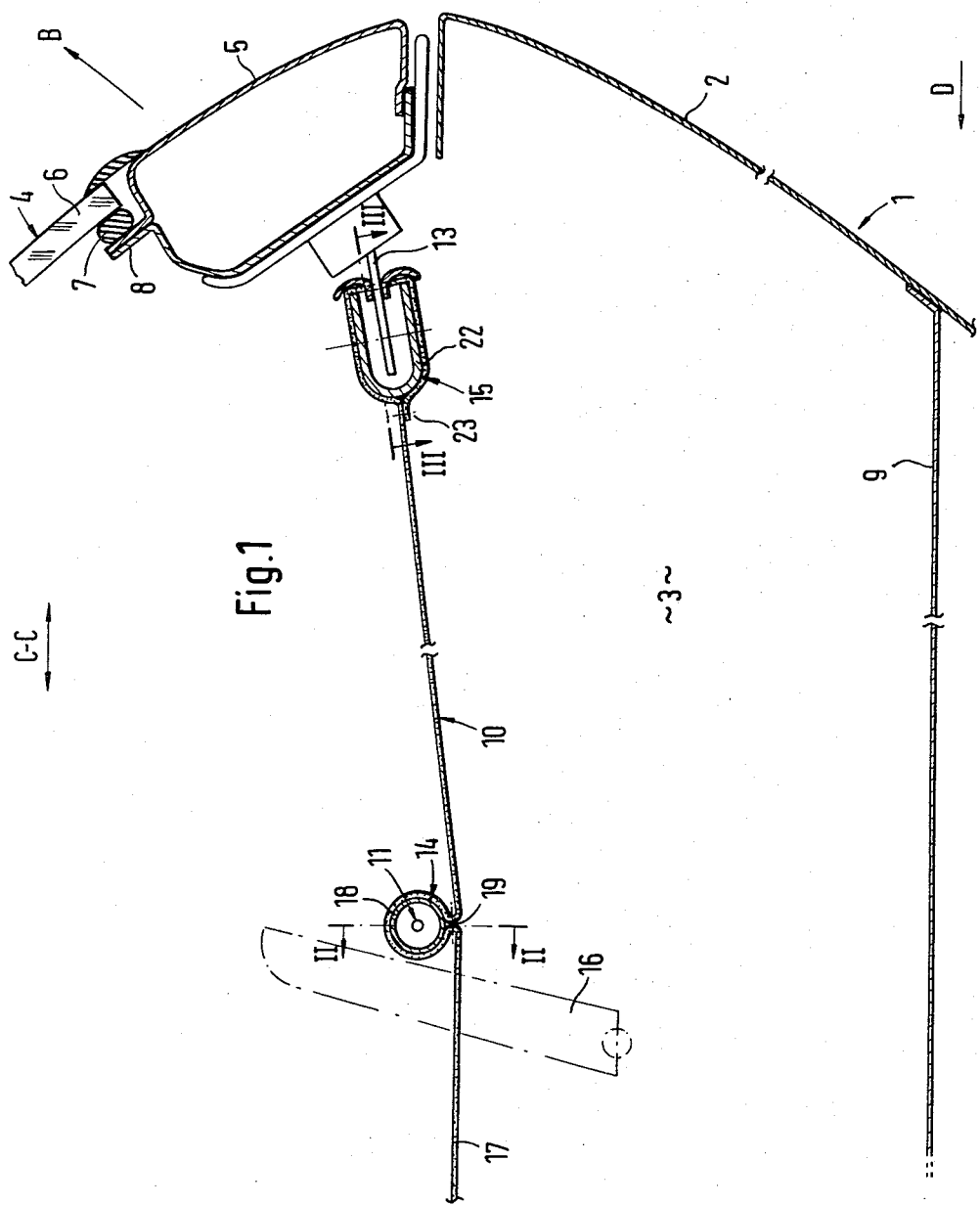

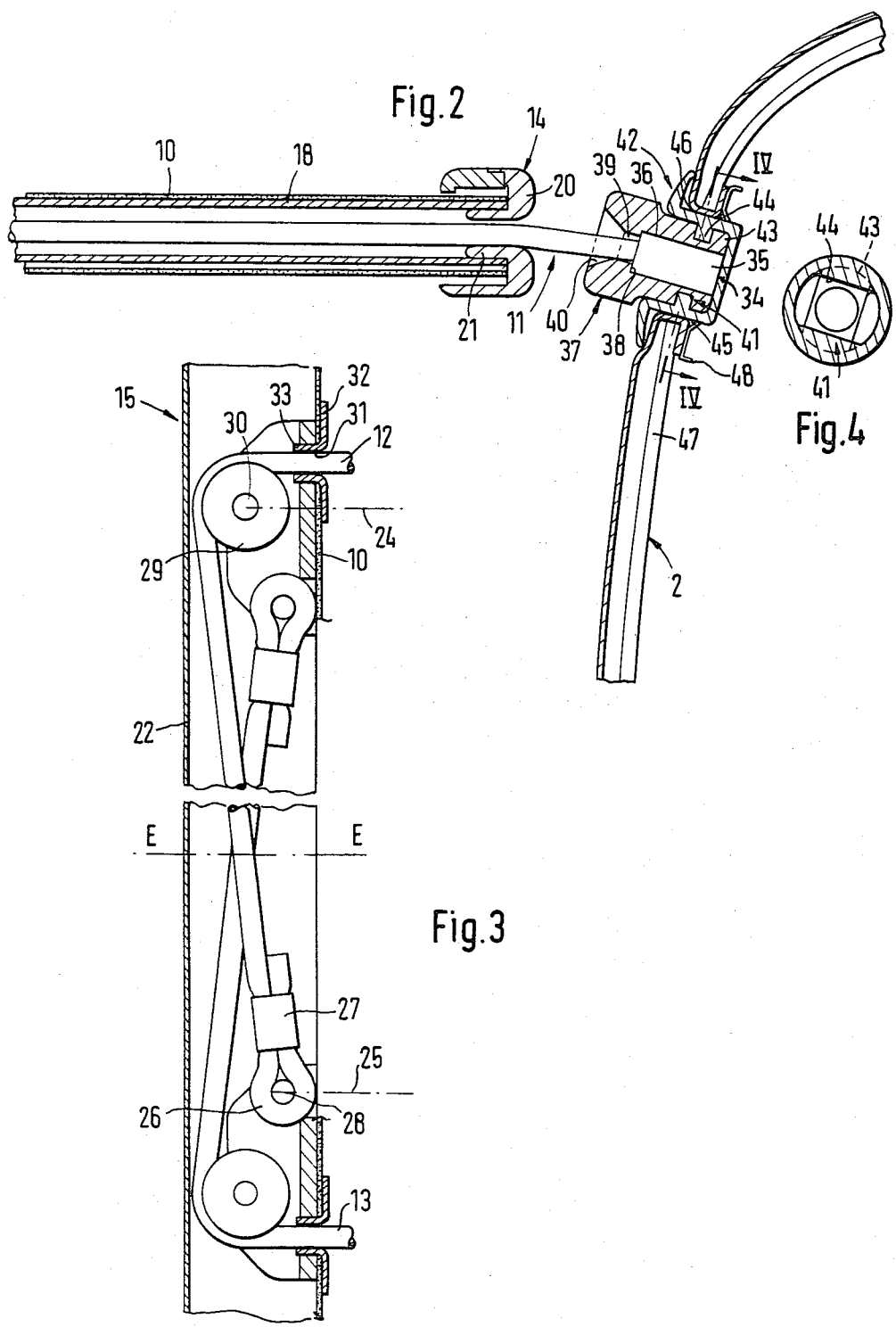

COVER FOR PASSENGER CAR TRUNKS

BACKGROUND AND SUMMARY OF THE INVENTION

The invention relates to a cover for passenger car trunks that are accessible through a rear lid or tailgate that is movable about a horizontal hinge axis, said cover being made of elastic material and attached to the body and the lid.

A known cover of the above-cited type (German application (Offenlegungsschrift) No. 1,630,866) is fixed directly by snap fasteners to the body and the lid. This structure entails the disadvantage that, especially when the angle of opening of the lid is large, the elastic extension of the cover is such that it must be made of expensive material. Even when suitable materials are used cracks may still develop in the cover in the cold season.

In another known trunk cover (U.S. Pat. No. 4,148,516) the cover is operated by an elastic member attached to the body and a pulling means possibly made of the same material and arranged on the lid. This system entails the disadvantages that, because of its rigid structure, the cover does not adapt to articles of different height placed in the trunk, and also that the member and the pulling means determine unjustifiable costs. In addition, the member, the pulling means, and the cover element protecting them, are all arranged in the longitudinal direction of the vehicle and occupy a large space which reduces the trunk capacity.

Thus, an object of the present invention is to provide a trunk space cover attached to the body and the lid in such a manner that no excessive stress is applied thereto in use. The cover fastening is also intended to be simple and functional, and to occupy little space together with its actuating system cooperating with the lid, without adversely affecting its operability.

According to a preferred embodiment of the invention, this object is achieved by the use of elastic members, of known construction, to fix the cover. These members are spaced on the cover in hollow elements extending perpendicularly to the vehicle longitudinal axis and are fixed to the body and the lid. For this purpose, the element to be fixed to the body comprises a tube whose ends carry extensions that are provided with guide portions for an elastic member. The element to be fixed to the lid is a U-section element around which the cover is wrapped. Two elastic members are provided in this element, and each of said members is fixed or deflected at the opposite ends. Rotary rollers are mounted in the elements to effect the deflection. Near the rollers the members pass through openings in the cover, and these openings are provided with grommets with guide portions for the members. The elastic members consist of elastic cords. The cord ends at the body and the lid are provided in the body and the lid.

Principal advantages of the invention are derived from the indirect fastening of the cover by the elastic members, which prevents excessive stressing of the cover on operation of the lid. The members do not constitute a hindrance, i.e. occupy no significant space, and are contained in the tube and the U-shaped element. The arrangement of the two members in the U-shaped element and their fixation and deflection at the two opposite ends (long spring elongation range) assures that the stresses applied to the two members are light even when the angle of opening of the lid is large. Finally, the cover is easily installed with the fasteners attached to the members consisting of elastic cords and provided with snap locking means.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a partial longitudinal section through the rear portion of a passenger car provided with the cover of the invention;

FIG. 2 is a section on a larger scale, along line II—II in FIG. 1;

FIG. 3 is a section on a larger scale, along line III—III in FIG. 1;

FIG. 4 is a section along line IV—IV in FIG. 2.

DETAILED DESCRIPTION OF THE PREFERRED EMBODIMENT

The represented portion of a passenger car 1 comprises a body 2 and a trunk 3. Trunk 3 is accessible through a rear lid or tailgate 4 that is pivotable about a horizontal hinge axis (not shown), so that lid 4 moves in direction B. Said lid consists of a frame 5 and a panel 6 secured to a flange 8 of the frame by an adhesive strip 7. A lock (not represented) is provided between body 2 and lid 4. In vehicles of the type wherein the prresent invention finds greatest application, panel 6 is formed of glass.

Trunk 3 is limited by a horizontal wall 9 and a cover 10 substantially parallel thereto. Cover 10 is made of elastic material and is attached to body 2 and lid 4 by elastic members 11, 12, and 13 extending in hollow elements 14 and 15.

Elements 14 and 15 extend perpendicularly to the vehicle longitudinal axis C—C and are fixed at spaced intervals in said direction on cover 10. Element 15 extends near frame 5, and element 14 is located behind a pivotable seat back 16 of a rear seat. In a folded position, wherein the seat back is folded forward about axis 16a, the seat back 16 is covered by a portion 17 of cover 10.

Element 14 used for fastening cover 10 to the body comprises a tube 18. Cover 10 is wrapped at least partially around it. Cover 10 is stitched at 19 to form a tubular pocket within which the wrapped tube is retained. The ends of tube 18 carry extensions 20 that are provided with guide portions 21 for the member 11 contained therein.

Element 15 used in fastening the cover 10 to the lid comprises a horizontal U-section element 22 that has an open side oriented in a direction opposite to the direction of travel D. Element 15 is attached to cover 10 in a manner similar to element 14, i.e., cover 10 is wrapped around element 22 and stitched at 23 for this purpose.

In FIG. 3, the two members 12 and 13 are shown in U-shaped element 22. The ends of members 12, 13 are deflected and fixed at 24, 25, respectively i.e. outside the median longitudinal plane E—E. A loop 26 is formed in member 12 to secure said member, and the loop is held in place by a clamp 27. Loop 26 is retained by a pin 28 provided on element 22. A roller 29 that is rotatably mounted at 30 is used to deflect member 12. Cover 10, wrapped around element 22, is provided with a grommet 32 near roller 29. Grommet 32 comprises a guide portion 33 for member 12 whose free end is attached to lid 4. According to the same principle member 13 is fixed and deflected in an inverse arrangement after passing through a like grommet 32'. The distance between 24 and 25 is determined substantially by the maximum opening of lid 4 and the length of member 12, 13 so as to assure proper supporting of the cover 10 when lid 4 is closed, while having sufficient extensibility to enable full opening of the lid without undue effort.

Members 11, 12, and 13 consists of elastic cords of preferably circular cross-section. The end, for example 34 (member 11), of each of the cords terminating at body 2 or lid 4 are provided with an expansion 35 that is accommodated in a corresponding recess 36 in a fastener 37. The expansion 35 of member 11 is in contact with an abutment 38 of fastener 37, and said member 11 passes through an opening 39 in the fastener. Expansion 35 may also be fixed by adhesive bonding. Opening 39 is flared at 40 toward tube 18 (FIG. 2) so that no potential cutting areas can be contacted by an elastic element retained therein when forces applied directly or indirectly thereto force the elastic element radially about opening 39.

Fastener 37 is made of plastic and is held by a snap locking unit 41 in a retaining means 42, provided in body 2. Snap locking unit 41 consists of the elements 43 and 44 of fastener 37 and retaining means 42 which are engaged or disengaged by 90° rotation (FIG. 4).

Members 12 and 13 are considerably stretched when lid 4 is pivoted in direction B, and the portion of cover 10 between tube 18 and lid 4 pivots about tube 18 and member 11, thereby being raised to provide access to the trunk 3.

A cylindrical portion 45 of retaining means 42, also made of plastic, penetrates an opening 46 in a wall 47 of body 2 and is secured by a holding element 48 retained by the periphery of retaining means 42 and wall 47.

The structure and securing of the fastener to members 12 and 13 are identical to those of fastener 37.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A cover arrangement for passenger car trunks that are accessible, through a rear lid that is movable about a horizontal hinge axis, comprising a cover formed of an elastic material and means for attaching the cover to a trunk body portion and to the rear lid, characterized in that said attachment means comprises elastic members for fastening the cover, said elastic members being spaced from each other on the cover and being located in hollow elements that are connected to the cover and extend perpendicularly to a vehicle longitudinal axis, wherein the elastic member in one of said hollow elements fastens the cover to opposite lateral walls of the body and elastic members in another of the hollow elements fastens the cover to the lid.

2. The cover arrangement as in claim 1, characterized in that the one hollow element used in fastening the cover to the body comprises a tube having ends carrying extensions that are provided with guide portions for a respective elastic member.

3. The cover arrangement as in claim 1, characterized in that the element used for fastening the cover to the lid is a U-section element around which the cover is wrapped.

4. The cover arrangement as in claim 3, characterized in that two elastic members are provided in said one hollow element, each of said two elastic members being connected to said lid at one end and deflected and fixed at the opposite ends.

5. The cover arrangement as in claim 4, characterized in that rotatably mounted rollers are provided in said one hollow element for deflecting the opposite ends of the elastic members.

6. The cover arrangement as in claim 5, characterized in that said two elastic members extend through openings in the cover, said openings being provided with grommets having guide portions through each of which a respective one of said elastic members passes.

7. The cover arrangement as in claims 1 or 2 or 3 or 4 or 5 or 6, characterized in that the elastic members consist of elastic cords.

8. The cover as in claim 7, characterized in that ends of the cords near the body and the lid are provided with expansions retained in fasteners.

9. The cover as in claim 8, characterized in that the fasteners cooperate by means of releasable snap locking means with retaining means provided respectively in the body and the lid.

* * * * *